United States Patent [19]
Yun

[11] Patent Number: 5,469,269
[45] Date of Patent: Nov. 21, 1995

[54] HIGH SPEED OPTICAL INFORMATION SYSTEM AND METHOD

[75] Inventor: Jong K. Yun, Kyounggi, Rep. of Korea

[73] Assignee: SamSung Electronics Co., Ltd., Kyungki, Rep. of Korea

[21] Appl. No.: 791,198

[22] Filed: Nov. 13, 1991

[30] Foreign Application Priority Data

Jan. 31, 1991 [KR] Rep. of Korea .................. 91-1890

[51] Int. Cl.$^6$ ............................................. H04N 5/76
[52] U.S. Cl. ................................ 358/335; 360/10.1
[58] Field of Search ..................................... 358/335, 310, 358/312, 338, 321, 337, 320, 906, 909, 158, 58, 216; 360/10.1, 10.2, 10.3

[56] References Cited

U.S. PATENT DOCUMENTS

| | | | |
|---|---|---|---|
| 4,418,358 | 11/1983 | Poetsch et al. | 358/80 |
| 4,733,311 | 3/1988 | Yoshinaka | 358/320 |
| 4,930,024 | 5/1990 | Kanda et al. | 360/10.1 |
| 5,010,419 | 4/1991 | Heidt et al. | 358/335 |
| 5,063,437 | 11/1991 | Owashi et al. | 358/22 |
| 5,084,766 | 1/1992 | Nakatani | 358/335 |
| 5,140,566 | 8/1992 | Kang et al. | 369/13 |

*Primary Examiner*—Tommy P. Chin
*Assistant Examiner*—Robert Chevalier
*Attorney, Agent, or Firm*—Robert E. Bushnell

[57] ABSTRACT

A high speed optical information search system, comprising a scanning device means for scanning along the vertical lines on the optical magnetic tape, a pick-up device for sensing and accumulating data of the tape and for shift-transmitting and outputting the accumulated data in accordance with a shift clock, a memory circuit for writing and reading digital data information outputted from the pick-up device, a clock for generating clock signals corresponding to a transmission bit speed and to a speed of 5 times of a data transmission bit speed, a reading address counter for counting in accordance with a clock signal corresponding to the data transmission bit speed outputted from the clock during high and normal speed regeneration, a writing address counter for counting according to a clock signal corresponding to predetermined times of the transmission bit speed outputted from the clock during the high speed search, a writing address control circuit for controlling the output signals from the pick-up device to be written in the memory circuit in accordance with the address counted by the writing address counter during a predetermined time span of the frame period under the high speed search mode, a demodulating circuit for demodulating digital signals of the memory circuit to analogue video signals, and a writing/reading control circuit for detecting odd and even fields from the synchronizing signals loaded on composite video signals outputted from the demodulating circuit and for outputting control signals to control the writing/reading to and from the memory circuit.

10 Claims, 2 Drawing Sheets

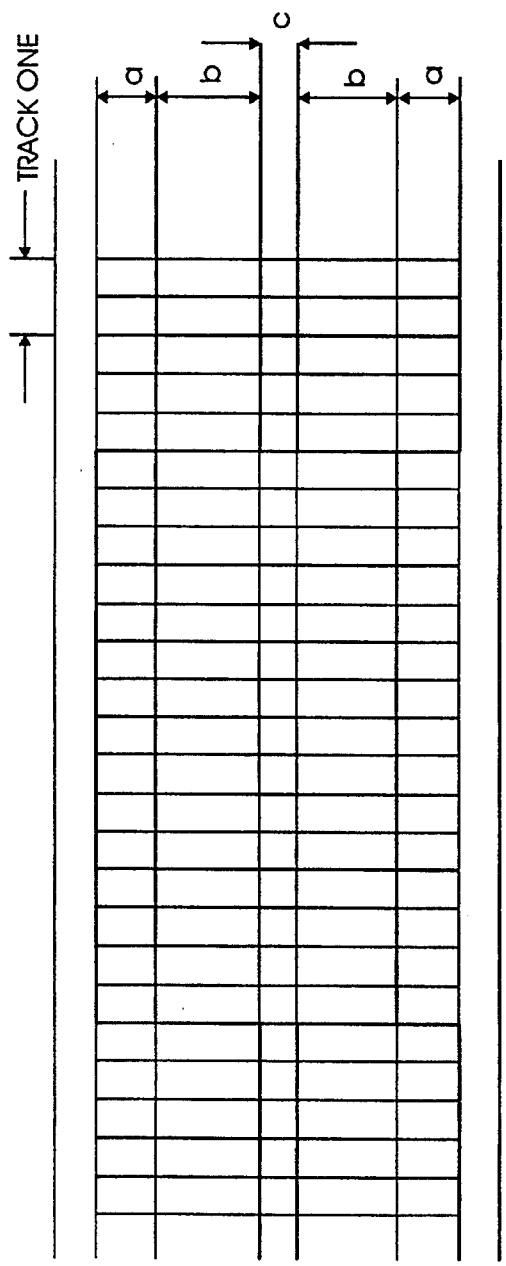
FIG. 2
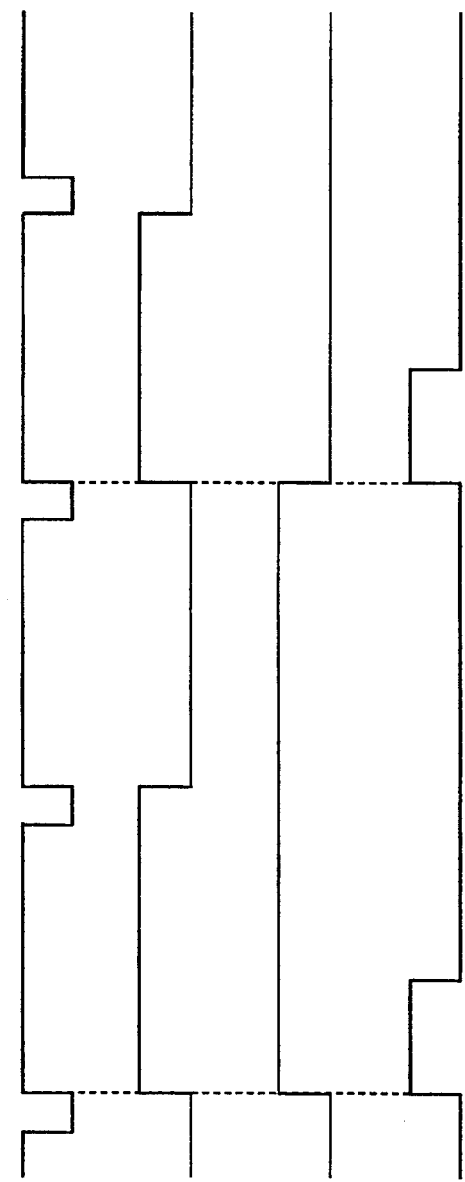
FIG. 3A
FIG. 3B
FIG. 3C
FIG. 3D

HIGH SPEED OPTICAL INFORMATION SYSTEM AND METHOD

FIELD OF THE INVENTION

The present invention relates to a high speed optical information search system for an optical information recording and regenerating apparatus, and more particularly to, a search system in which the reading time of a charge coupled device for converting optical information recorded optical data in vertical lines to electrical signals by laser beams can be controlled so as to perform high speed searches.

BACKGROUND OF THE INVENTION

Conventionally, in order to maximize the track length of a video tape, helical scannings have been carried out in such a manner that a rotary head with an inclined posture can scan over the face of the tape, and thus, the picture information of one field is recorded on one track.

However, in carrying out a high speed search on the tape which is recorded by the helical scannings, many tracks are crossed over, and only a part of the video signals recorded on the tracks are picked up, so that the picture is regenerated with noise bars contained therein, thereby making it difficult to perform a normal picture regeneration.

SUMMARY OF THE INVENTION

The present invention is intended to overcome the above described disadvantages of the conventional techniques. Therefore, it is an object of the present invention to provide a high speed optical information search system in which video data corresponding to the predetermined number of horizontal periods is recorded on a tape in vertical lines by laser beams, and digital data accumulated on a charge coupled device (to be called CCD below) for converting the optical information to electrical signals is written at a high speed, so that the written information can be normally read out and that the information of the jumped frame at the predetermined number should be regenerated into a clear picture.

In achieving the above object, the high speed optical information search system according to the present invention comprises a scanning means for scanning the electrical/optical converted video signals on an optical magnetic tape in the form of vertical lines, a pick-up means for sensing and accumulating the information based on the surface conditions of the optical magnetic tape and for outputting and shift-transmitting the accumulated information in accordance with shift clocks, a memory means for writing and reading the information of the digital data outputted from the pick-up means, a clock generating means for generating clock signals corresponding to predetermined times of an information transmission bit speed, a reading address counter for counting by the clock signals corresponding to the information transmission bit speed outputted from the clock generating means during a normal regeneration or a high speed search, a writing address counter for counting by the clock signals corresponding to predetermined times the data transmission bit speed outputted from the clock generating means during the high speed search, a writing address control means for controlling the writing address counter in such a manner as counting during a predetermined time span in the frame period, so that the output signals of the pick-up means can be written in the memory means, a demodulating means for demodulating the digital signals from the memory means to composite analogue video signals, and a writing and reading control means for detecting odd and even fields from synchronizing signals loaded on the composite video signals of the demodulating means and for outputting control signals in order to control the writing and reading of information to and from the memory means.

BRIEF DESCRIPTION OF THE DRAWINGS

The above object and other advantages of the present invention will become more apparent by describing in detail the preferred embodiment of the present invention with reference to the attached drawings in which:

FIG. 2 is a diagram showing recording format of an optical magnetic tape according to the present invention; and FIGS. 3 including FIG. 3A–3D are waveform diagrams of the signals outputted from the high speed optical information search system shown in FIG. 1.

DESCRIPTION OF THE PREFERRED EMBODIMENT

Figure 1:
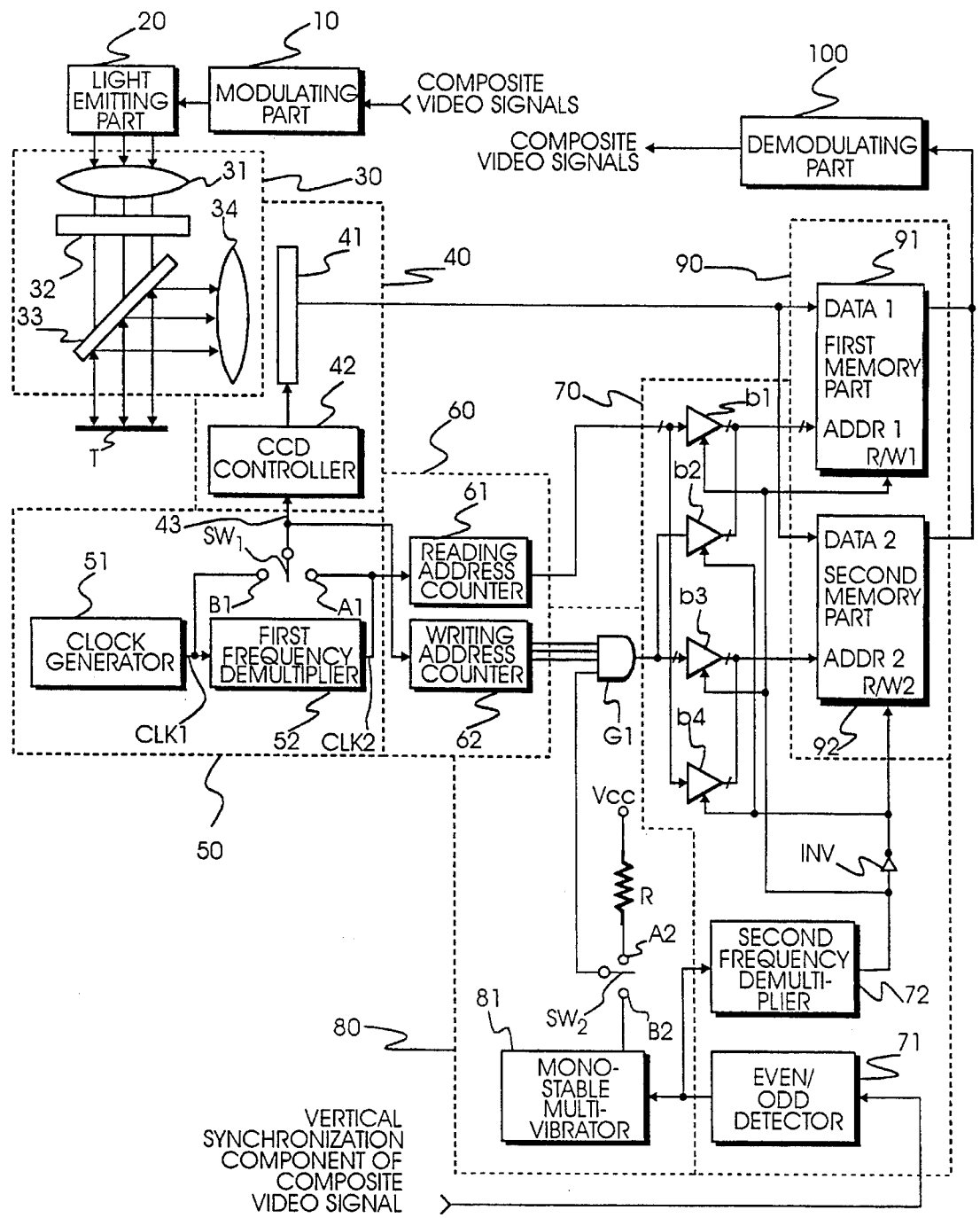
FIG. 1 is a block diagram showing a high speed optical information search system according to the present invention.

FIG. 1 illustrates a block diagram of the constitution of a high speed optical information search system according to the present invention.

As shown in FIG. 1, the output terminal of a modulating part 10 which converts composite video signals income from a signal inputting source to a digital form is connected to the input terminal of a light emitting part 20 which converts modulated digital video signals to laser beam signals in order to output laser beam data.

A focusing part 30 is vertically connected to the laser beam outputting face of the light emitting part 20 and includes a convex mirror 31 for making a laser output scan in a parallel beam form, a translucent mirror 33 for reflecting with an angle of 90 degrees the beams reflected from the surface of an optical magnetic tape T, which the reflected beams are the laser output income through the convex mirror 31, and a light receiving lens 34 for receiving the output beams of the translucent mirror 33.

A pick-up means 40 includes a line CCD array 41 for sensing and accumulating the data recorded on the tape T, which is outputted from the light receiving lens 34, and for shift-transmitting the accumulated data in accordance with a shift clock, and a CCD controller 42 for controlling the transmitting speed of the line CCD array 41 in accordance with the clock outputted from a clock generating means 50.

The clock generating means 50 includes a clock generator 51 for generating clock signals corresponding to a modulating frequency to be used in modulating video signals to digital signals by the modulating part 10, a first frequency demultiplier 52 for dividing the output frequency of the clock generator 51 into 5, and a first shifting switch SW1 connected to a control terminal 43 of the CCD controller 42 in such a manner as switching over the output frequency of the clock generator 51 or that of the first frequency demultiplier 52.

An address generating part 60 includes a reading address counter 61 and a writing address counter 62, and the clock terminal of the reading address counter 61 is connected both to a fixed terminal A1 of the first shifting switch SW1 and to the output terminal of the first frequency demultiplier 52, while its output terminal is connected to the input terminals of buffers b1, b4.

Further, the clock terminal of the writing address counter 62 is connected to the control terminal of the CCD controller 42, and its output terminal is connected to the input terminal of an AND gate G1.

A writing/reading control part 70 includes an E/O detector 71 and a second frequency demultiplier 72, and the E/O detector 71 discriminatingly detects the even and odd fields in accordance with vertical synchronizing signals outputted from a synchronizing signal separating part (not shown). The output terminal of the E/O detector 71 is connected to the input terminal of the second frequency demultiplier 72, and the output terminal of the second frequency demultiplier 72 is connected to the input terminal of an inverter INV.

A writing address control part 80 includes a monostable multivibrator 81, and the input terminal of the monostable multivibrator 81 is connected to the output terminal of the E/O detector 71, while its output terminal is connected to another fixed terminal B2 of a second shifting switch SW2.

The second shifting switch SW2 is connected to the input terminal of the AND gate G1, and a fixed terminal A2 is connected to the other end of a resistor R connected to a supply voltage terminal Vcc. The output terminal of the AND gate G1 is connected to the input terminals of buffers b2,b3.

The input terminal of the inverter INV is connected to the control terminals of the buffers b1,b3, and the output terminal of the inverter INV is connected to the control terminals of the buffers b2,b4.

The memory part 90 includes a first memory part 91 and a second memory part 92, and a data input terminal DATA1 of the first memory part 91 is connected to the output terminal of the line CCD array 41 and an address input terminal ADDR1 of the first memory part 91 is connected to the output terminal of the buffer b2, and its writing/reading control input terminal R/W1 is connected to the input terminal of the inverter INV.

Further, a data input terminal DATA2 of the second memory part 92 is connected to the output terminal of the line CCD array 41, and its address input terminal ADDR2 is connected to the output terminals of the buffers b3,b4, while its writing/reading control input terminal R/W2 is connected to the output terminal of the inverter INV.

A demodulating part 100 demodulates the data (read from the memory part 90 to composite analogue video signals to display them to a display apparatus such as the monitor of a color television. A synchronization signal separating part (not shown in the drawings) separates synchronizing signals from the composite video signals, and the output signals of it are outputted to the input terminal of the E/O detector 71.

The high speed optical information search system of the present invention constituted as above will now be described as to its operations.

Referring to FIG. 1, the composite video signals which are outputted from a signal input source (not shown) such as a video camera, a color television and the like are modulated by the composite video signal modulating part 10 to the form of a digital signal, and then, the signals are supplied to the light emitting part 20. Corresponding to the modulated digital information of the modulating part 10, the laser beams of the light emitting part 20 are inputted into the cylindrical lens 32 in the form of parallel beams by the function of the focusing mirror 31 of the focusing part 30. The beams are let scan from the cylindrical lens 32 through the translucent mirror 33 onto the surface of the optical magnetic tape as shown in FIG. 2. Under this condition, although it is not illustrated in the drawings, the focusing part 30 moves its scanning positions by a motor.

That is, it includes two control tracks a loaded with control signals for indicating the field or frame of the picture, two video tracks b loaded with video signals corresponding to a horizontal period H for in the form of a vertical line, and a aural track c loaded with aural signals corresponding to two horizontal periods 2H.

Meanwhile, if the surface condition of the tape shows a convex shape, the laser beams are randomly reflected, so that the beams can not reach the light receiving lens 34 in spite of the function of the translucent mirror 33. On the other hand, if the surface of the tape is flat, the beams are reflected in the vertical direction by the translucent mirror 33 and are accumulated in the line CCD array 41 after being received into the light receiving lens 34.

The line CCD array 41 senses the beam reflecting state through the light receiving lens 34, according to the tape surface condition, and the sensed results are shift-transmitted to the data input terminals DATA1,DATA2 of the first and second memories 91,92 in accordance with the shift clock under the control of the CCD controller 42. Here, the shift clock refers to a clock signal outputted from the clock generating part 50.

That is, the clock generator 51 of the clock generating part 50 generates clock signals CLK1 which are equivalant to 5 times of the modulated frequency corresponding to the data transmitting bit frequency of the modulating part, i.e., the frequency used for a high speed regeneration. The first frequency demultiplier 52 outputs clock signals CLK2 having a frequency corresponding to the data transmitting bit frequency, i.e., a frequency obtained by dividing the output frequency of the clock generator 51 into 5. Accordingly, the shift clocks become the clock signals CLK2 used under the general regeneration mode and the clock signal CLK1 used for a high speed search mode.

Under a normal regeneration mode, the shifting switch SW1 is short-circuited to the fixed terminal A1, and therefore, the output frequency of the first frequency demultiplier 52 is supplied to the clock input terminals of the reading address counter 61 and the writing address counter 62.

As shown in FIG. 2, the reading address counter 61 and the writing address counter 62 will count 525H forming one picture because one line loads video signals for 2H.

Further, the output signals of the reading address counter 61 are supplied to the buffers b1,b4, and the output signals of the writing address counter 62 are supplied to the input terminal of the AND gate G1. Meanwhile, the shifting switch SW2 is short-circuited to the fixed terminal A2, so that logic "high" signals should be supplied to the AND gate all the time.

Under this condition, if a vertical synchronizing signal as shown in FIG. 3A is inputted from a synchronization signal separating part (not shown), the E/O detector 71 detects whether it corresponds to the even or odd field, with the result that a signals having the waveform shown in FIG. 3B is outputted. The period of the even field is longer by 0.5 H than that of the odd field.

The output signals (FIG. 3B) of the E/O detector 71 are divided into 2 by the second frequency demultiplier 72, and a signal having the waveform of FIG. 3C is supplied to the input terminal of the inverter INV.

If the output signals of the second frequency demultiplier 72 is in a logic "high" state, the buffers b1,b3 and the first memory part 90 are controlled.

That is, the second memory 92 receives a signal through the buffer b3 into the address input terminal ADDR2 in accordance with the clock signal of the first frequency demultiplier 52 after counting by the writing address counter 62, and therefore, the data which has been accumulated in the CCD line array 41 and transmitted therefrom is written in the designated address.

The first memory part 91 receives a signal through the buffer b1 into the address input terminal ADDR1 in accordance with the clock signal of the first frequency demultiplier 52 after counting by the reading address counter 61, and then, the stored data is read out in the form of the composite video signals to be displayed through the demodulating part 100 to the monitor of the color television.

Meanwhile, in case the output signals of the second frequency demultiplier 72 are in a "low" logic state, the buffers b2,b4 and the first memory part 90 are controlled.

The first memory part 91 receives a signal through the buffer b2 into the address input terminal ADDR1 in accordance with the clock signal of the first frequency demultiplier 52 after counting by the writing address counter 62, and therefore, the data which is accumulated in the line CCD array 41 and transmitted therefrom is written into the designated address.

The second memory part 92 receives a signal through the buffer b4 into the address input terminal ADDR2 in accordance with the clock signal of the first frequency demultiplier 52 after counting by the reading address counter 61, and therefore, the data stored in the designated address is read out to be displayed through the demodulating part 100 to the monitor.

Meanwhile, under 5 times of a speed regenerating mode, the first shifting switch SW1 is short-circuited to the other fixed terminal B1, so that the clock terminal of the reading address counter 61 should receive a clock signal outputted from the first frequency demultiplier 52, having a frequency corresponding to the data transmission bit speed. Meanwhile, the clock terminal receives a clock signal outputted from the clock generator 51, having a frequency corresponding to 5 times of the transmission data bit speed.

Under this condition, the counting speed of the writing address counter 62 is 5 times faster than that of the reading address counter 61.

Here, the monostable multivibrator 81 functions in such a manner that the second shifting switch SW2 switches high level signals which are triggered to a high level during the time corresponding to ⅕ of the period of the output signal (FIG. 3B) of the E/O detector 71 as shown in FIG. 3D, and the switched high level signal is supplied to the AND gate G1.

Accordingly, in the case where the output signal of the second frequency demultiplier 72 is in the logic "high" state, the writing and reading out operations of the buffers b1,b3 and memory part 90 are controlled.

That is, the second memory part 92 receives a signal through the buffer b3 into its address input terminal ADDR2 in accordance with the clock signal of the clock generator 51 after counting at a speed of 5 times of the data transmission bit speed by the writing address counter 62.

Therefore, the digital data accumulated in the CCD array 41 are written at a speed of 5 times while the output signals (FIG. 2D) of the monostable multivibrator 81 are triggered. The first memory part 91 receives a signal through the buffer b1 into the address input terminal ADDR1 in accordance with the clock signal of the first frequency demultiplier 52 after counting by the reading address counter 61 at a speed corresponding to the data transmission bit speed, and therefore, the stored data are read out to be displayed in the form of complex video signals through the demodulating part 100 to a monitor.

Further, in case the output signal of the second frequency divider 72 is in a "low" state, the buffers b2,b4 and the memory part 90 are controlled in performing the data writing/reading operations.

That is, the first memory part 91 receives a signal through the buffer b2 into its address input terminal ADDR1 in accordance with the clock signal of the clock generator 51 while the output signals (FIG. 2D) of the monostable multivibrator 81 are in a triggered state, after counting by the writing address counter 62 at a speed 5 times of the data transmission bit speed. Therefore, the data which is accumulated in the line CCD array 41 and transmitted therefrom can be written into the designated address at a speed of 5 times.

The second memory part 92 receives a signal through the buffer b4 into its address input terminal ADDR2 in accordance with the clock signal of the first frequency demultiplier 92 after counting by the reading address counter 61 at a speed corresponding to the data transmission bit speed. Therefore, the data stored in the designated address are read out in the form of the composite video signals to be displayed through the demodulator 100 to the monitor.

Meanwhile, under a high speed regeneration mode, the digital data which is picked up by the CCD array 41 is written at a speed of 5 times during a time span corresponding to ⅕ of the time span required for a normal regeneration, while the reading and displaying can be done at the normal speed. Thus, when the picture of the next frame is regenerated, the pictures for the 4 frames are not regenerated, but the picture for the fifth frame is regenerated.

Thus, the high speed optical information search system according to the present invention comprises a scanning means for scanning along the vertical line on the optical magnetic tape in search of the electrical/optical converted video signals, a pick-up means for sensing and accumulating the data based on the surface conditions of the optical magnetic tape and for shift-transmitting and outputting the accumulated data in accordance with the shift clock, a memory means for writing and reading the digital data outputted from the pick-up means, a clock generating means for generating clock signals corresponding to the data transmission bit speed and for generating clocks corresponding to a speed of 5 times of the data transmission bit speed, a reading address counter for counting in accordance with a clock signal corresponding to the data transmission bit speed and outputted from the clock generating means during a high speed search and a normal speed regeneration, a writing address counter for counting in accordance with a clock signal corresponding to predetermined times of the data transmission bit speed and outputted from the clock generating means during the high speed search, a writing address control means for controlling so as for the output signals of the pick-up means to be written in the memory means in accordance with the address counted by the writing address counter during a predetermined time span of the frame period under the high speed search mode, a demodulating means for demodulating the digital signals of the memory means to analogue video signals, and a writing/reading control means for detecting the odd and even fields from the synchronizing signals loaded on the composite video signals outputted from the demodulating means and for outputting writing/reading control signals in order to control the data writing/reading to and from the memory means. Thus, video data corresponding to a predetermined number of horizontal periods is recorded in the form of vertical lines on the optical magnetic tape using laser beams, and the optical information recorded on the tape is accumulated. Thus, the data is transmitted in the above described manner, and the writing/reading of the output signals of the CCD is controlled, so that the picture during the high speed search is clearly regenerated.

What is claimed is:

1. A high speed optical information search system, comprising:

scanning means for providing a scanned signal by scanning electrical/optical converted video signals on an optical magnetic tape in a form of vertical lines;

pick-up means for receiving the scanned signal from the scanning means in dependence upon surface conditions of said optical magnetic tape, and for transmitting said scanned signal in dependence upon one of a first clock signal and a second clock signal;

memory means for storing data, corresponding to the scanned signal, from said pick-up means;

clock generating means for generating the first clock signal corresponding to a predetermined data transmission bit frequency, and for generating the second clock signal having a frequency corresponding to a multiple of the predetermined data transmission bit frequency;

a reading address counter for counting pulses of said first clock signal for reading the stored data from the memory means, said first clock signal corresponding to said predetermined data transmission bit frequency during one of a normal regeneration mode and a high speed search mode;

a writing address counter for counting pulses of said second clock signal for writing said data to the memory means, said second clock signal corresponding to the predetermined times of said predetermined data transmission bit frequency during said high speed search mode, and for counting the pulses of said first clock signal for writing said data to the memory means during the normal regeneration mode;

writing address control means for enabling provision of addresses from said writing address counter corresponding to the count of the pulses of the first clock signal to write enable the memory means during the normal regeneration mode, and for enabling provision of said addresses from said writing address counter corresponding to the count of the pulses of the second clock signal to write enable the memory means during the high speed search mode in response to a control signal pulse having a lesser duration than odd and even fields of a frame period;

demodulating means for demodulating said stored data from said memory means to generate composite analog video signals; and writing/reading control means for detecting said odd and even fields from a vertical synchronizing component of said composite video signals of said demodulating means, and for producing control signals to control the writing and reading of said data by said memory means and said provision of said addresses by said writing address control means.

2. The high speed optical data search system as claimed in claim 1, wherein the electrical/optical converted video signals of a predetermined number of horizontal periods are recorded on said optical magnetic tape by said scanning means in the form of vertical lines.

3. A high speed optical information search system for producing a clear picture without noise bars when regenerating a video signal from an optical tape in a high speed regenerating mode, said high speed optical information search system comprising:

means for transferring video data corresponding to optical data from said optical tape in one of a normal speed regenerating mode and the high speed regenerating mode;

memory means for storing said video data in the normal speed regeneration mode in response to writing addresses derived from a first clock signal corresponding to a predetermined data transmission bit frequency and a read/write control signal, for storing said video data in the high speed regeneration mode in response to writing addresses derived from a second clock signal having a second clock signal frequency being a multiple greater than one of the predetermined data transmission bit frequency and said read/write control signal, and for reading the stored video data in response to reading addresses derived from said first clock signal and said read/write control signal;

means for deriving said read/write control signal from a vertical synchronization component of a video signal regenerated from said video data;

a controller for controlling the transferring means in response to the first and second clock signals;

a first switch for transmitting said second clock signal to said controller during said high speed regeneration mode, and for transmitting said first clock signal to said controller during said normal speed regeneration mode;

a reading address counter for providing said reading addresses to said memory means by counting pulses of said first clock signal during said normal speed regeneration mode and said high speed regeneration mode;

a writing address counter for providing said writing addresses to said memory means by counting said pulses of the first clock signal during the normal speed regeneration mode; and by counting pulses of the second clock signal during the high speed regeneration mode; and means for controlling application of said writing address to said memory means by gating said writing address during said high speed regeneration mode with pulses derived from a vertical synchronization component of the regenerated video signal, each said pulse having a lesser duration than a period of said vertical synchronization component.

4. The high speed optical information search system of claim 3, wherein the second clock signal frequency is five times the predetermined data transmission bit frequency.

5. A high speed optical information search system for producing a clear picture from an optical tape without noise bars when regenerating a video signal in a high speed regenerating mode for transporting said optical tape at a higher speed than a normal speed regenerating mode, said high speed optical information search system comprising:

means for reproducing the video signal from said optical tape by retrieving the video signal;

means for transferring the reproduced video signal to a memory in response to one of a first clock signal during said normal speed regenerating mode and a second clock signal during said high speed regenerating mode;

clock generating means for generating the first clock signal having a first frequency, and for generating the second clock signal having a second frequency being a multiple of the first frequency;

reading address counter means for counting pulses of the first clock signal for providing reading addresses to the memory during one of the normal speed regenerating mode and the high speed regenerating mode;

writing address counter means for producing writing addresses for the memory by counting the pulses of the first clock signal during the normal speed regenerating mode, and by counting pulses of the second clock signal during the high speed regenerating mode;

an even/odd field detector for generating an even/odd signal corresponding to even and odd fields of a frame of the video signal, in response to a vertical synchronization component of the video signal;

a monostable multivibrator for generating a pulse in response to the even/odd signal, said pulse occurring for a portion of each period of said even/odd signal; and means for controlling writing of the reproduced video signal from the transferring means into the memory during the normal speed regeneration mode by providing said writing addresses to the memory, and for controlling writing of the reproduced video signal from the transferring means into the memory during the high speed regeneration mode by gating the writing addresses with said pulse.

6. The high speed optical information search system of claim 5, wherein the first frequency of the first clock signal generated by said clock generating means is five times the second frequency of the second clock signal.

7. A high speed optical information search system for producing a clear picture without noise bars from an optical tape when reproducing a video signal in a high speed reproducing mode for transporting said optical tape at a higher speed than a normal speed reproducing mode, said high speed optical information system comprising:

an optical scanner for scanning the optical tape to reproduce the video signal in said normal speed reproducing mode and said high speed reproducing mode;

a charge coupled device for transferring the reproduced video signal to a memory in response to one of a first clock signal corresponding to a predetermined data transmission frequency during said normal speed reproducing mode and a second clock signal corresponding to a high speed data transmission frequency being a multiple of the predetermined data transmission frequency during said high speed reproducing mode;

a charge coupled device controller for controlling the charge coupled device in response to the first and second clock signals;

a clock generator for generating the second clock signal;

a first frequency divider for generating the first clock signal by frequency dividing the second clock signal;

a first switch for transmitting the second clock signal to the charge coupled device controller during the high speed reproducing mode, and for transmitting the first clock signal to the charge coupled device controller during the normal speed reproducing mode;

a reading address counter for counting pulses of the first clock signal for providing reading addresses to the memory during one of the normal speed reproducing mode and the high speed reproducing mode;

a writing address counter for producing writing addresses for the memory by counting the pulses of the first clock signal during the normal speed reproducing mode, and by counting pulses of the second clock signal during the high speed reproducing mode;

an even/odd field detector for generating a periodic even/odd signal corresponding to even and odd fields of a frame of the video signal in response to a vertical synchronization component of the video signal;

a monostable multivibrator for generating a pulse in response to the even/odd signal, said pulse occurring for a portion of each period of said even/odd signal;

a second frequency divider for producing a divided signal by frequency dividing the even/odd signal;

a second switch for transmitting a continuous voltage level during the normal speed reproduction mode, and for transmitting said pulse during the high speed reproducing mode; and a logic gate for selectively providing said writing addresses to the memory in response to a logical combination of the write addresses and one of said pulse and said continuous voltage level transmitted from the second switch.

8. A method for performing a high speed regenerating mode and a normal speed regenerating mode in an optical information search system, said method comprising the steps of:

reproducing a video signal from an optical tape by retrieving the video signal;

transferring the reproduced video signal to a memory in response to one of a first clock signal during said normal speed regenerating mode and a second clock signal during the high speed regenerating mode;

generating the first clock signal corresponding to a predetermined data transmission bit frequency;

generating the second clock signal in response to a multiple of the predetermined data transmission bit frequency;

counting pulses of the first clock signal to provide reading addresses received by the memory during one of the normal speed regenerating mode and the high speed regenerating mode;

producing writing addresses for the memory by counting the pulses of the first clock signal during the normal speed regenerating mode, and by counting pulses of the second clock signal during the high speed regenerating mode;

generating a periodic even/odd signal corresponding to even and odd fields of a frame of the video signal in response to a vertical synchronization component of the video signal;

generating a pulse, said pulse occurring for a portion of each period of the even/odd signal;

controlling writing of the reproduced video signal into the memory during the normal speed regeneration mode by providing the writing addresses; and controlling writing of the reproduced video signal into the memory during the high speed regeneration mode by gating the writing addresses with said pulse.

9. The method of claim 8, wherein the frequency of said second clock signal is five times the frequency of said first clock signal.

10. A method of a high speed optical search, comprising the steps of: transferring video data from an optical tape through a charge coupled device at a first clock frequency corresponding to a predetermined data transmission bit frequency during a normal speed regenerating mode and at a second clock frequency during a high speed regenerating mode, said second clock frequency being a multiple greater than one of said predetermined data transmission bit frequency;

providing writing addresses to a memory during said normal speed regenerating mode at said first clock frequency by counting pulses of said first clock frequency;

providing the writing addresses to the memory during said high speed regenerating mode at said second frequency in dependence upon a gating pulse, by counting pulses of said second clock frequency;

providing reading addresses to the memory during said normal speed regenerating mode and said high speed regenerating mode at the first clock frequency by counting pulses of said first clock frequency;

writing said video data transferred through the charge coupled device within the memory at one of said first clock frequency and said second clock frequency in dependence upon said writing addresses provided to the memory and in dependence upon a read/write control signal;

reading said video data from the memory at the first clock frequency in dependence upon the reading addresses provided to the memory and in dependence upon a read/write control signal;

regenerating a composite video signal corresponding to said video data read from said memory;

generating said read/write control signal by frequency dividing a vertical synchronization component of a regenerated said composite video signal, a duration of a write phase and a read phase of said read/write control signal each corresponding to the duration of a frame of said regenerated composite video signal defined by an odd and even field of said vertical synchronization component; and generating said gating pulse from said vertical synchronization component, a duration of said gating pulse being less than the duration of a frame of said regenerated composite video signal.

* * * * *

UNITED STATES PATENT AND TRADEMARK OFFICE
CERTIFICATE OF CORRECTION

PATENT NO. : 5,469,269
DATED : November 21, 1995
INVENTOR(S) : Jong- Kyeung Yun

It is certified that error appears in the above-indentified patent and that said Letters Patent is hereby corrected as shown below:

Title page, item [75], Change "Jong K. Yun" to --Jong- Kyeung Yun--:

Signed and Sealed this

Twenty-ninth Day of October 1996

Attest:

BRUCE LEHMAN

Attesting Officer     Commissioner of Patents and Trademarks